Patented Feb. 22, 1938

2,109,015

UNITED STATES PATENT OFFICE 2,109,015

POLYCYCLIC PHENOLIC CONDENSATION PRODUCTS

Joseph B. Niederl and Victor Niederl, New York, N. Y.

No Drawing. Application July 5, 1935, Serial No. 29,918

6 Claims. (Cl. 260—154)

This invention relates to a process for the production of polycyclic phenolic condensation products, more particularly to such condensation processes which involve certain aliphatic, oxygen-containing compounds and various phenols. It relates further to new bicyclic phenolic compounds which may be obtained by these processes.

The aliphatic oxygen-containing compounds are those in which there are two reactive hydroxyl groups, either or both of which may be an alcoholic hydroxyl group or one which results from an enol transformation of a carbonyl group present in an aldehyde, acid, ketone or ester. In general these two hydroxyl groups are attached to carbon atoms which are in the $\beta$ position with relation to each other but in some cases they may be attached to adjoining carbon atoms.

Since, at the time these oxygen-containing compounds condense with the phenol, they all have hydroxyl groups present either an alcoholic hydroxyl or one resulting from an enol transformation, they will be designated in the appended claims as $\beta$-dihydroxy compounds generically.

These compounds may be divided into three general classes as follows:

A. $\beta$-dihydroxy compounds of which typical examples are the glycols such as 1.3-butanediol, 2.4-pentane diol, 1.3-propane diol and others of like structure and the $\alpha$-dihydroxy compound pinacol.

B. $\beta$-hydroxy carbonyl compounds. This class includes $\beta$-hydroxy carboxylic acids and their esters, $\beta$-hydroxy ketones and $\beta$-hydroxy aldehydes and the acetals of these ketones and aldehydes. These compounds have the general formulas

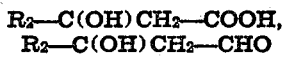

and

R₂—C(OH)CH₂CO—R respectively in which R is an alkyl group or hydrogen. Typical examples of these compounds are $\beta$-hydroxy butyric acid, $\beta$-hydroxy butaldehyde and diacetone alcohol.

C. $\beta$-dicarbonyl compounds in which the two carbonyl groups are attached to the same carbon atom. This class includes $\beta$-keto-carboxylic acids, $\beta$-keto-aldehydes, $\beta$-diketones, $\beta$-dialdehydes, $\beta$-dicarboxylic acids and $\beta$-aldehydo acids. These may be represented by the following general formulas

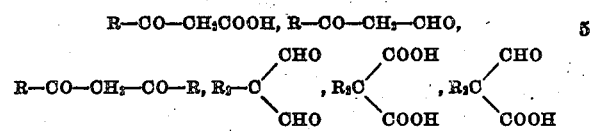

respectively, in which R is an alkyl group or hydrogen.

In the case of the aldehydes and ketones the condensation may take place with the enol form. In the case of acids either the free acid or any of its esters may be condensed with a phenol. One mol. of a compound of these classes may be condensed with one or with two mols of a phenol according to the conditions of condensation and the products desired. All of these products have valuable properties as such and also as intermediates for the preparation of condensation products with formaldehyde etc. and of other compounds. On account of their phenolic character they are valuable as insecticides, germicides etc.

A great many phenols may be condensed with the oxygen-containing compounds of the classes described above. Such phenols must have one reactive hydrogen atom, either ortho or para to the hydroxyl group, available for condensation. Mono or polynuclear phenols may be used or their nuclear substituted derivatives including halogen derivatives, alkyl phenols such as the cresols, ethyl, propyl, butyl, amyl, hexyl, heptyl, octyl and higher alkyl phenols in which the alkyl group may be a straight or branched chain and the phenol attached to a primary, secondary or tertiary carbon atom. The naphthols are also suitable for these condensations as are phenolic ethers containing one free phenolic hydroxyl group such for instance as the mono-alkyl ethers of resorcinol, hydroquinone etc. and the di-alkyl ethers of the trihydroxybenzenes. Di-alkyl phenols such as the xylenols, thymol, carvacrol and tri-alkyl phenols are likewise suitable for condensation with the oxygen-containing compounds described above.

Examples of specific $\beta$-dihydroxy compounds have been listed under A above but others of the same type are also suitable. $\beta$-hydroxy carbonyl compounds which may be used include diacetone alcohol, diacetophenone alcohol, and their homologs, β-hydroxy-butyric acid and its esters, and other similarly constituted compounds. The β-dicarbonyl compounds include malonic acid and its mono- or di-alkyl esters, aceto acetic acid and its esters and other compounds.

The condensation of the phenol and any of the oxygen-containing bodies may take place in two distinct steps. The first step is a simple condensation as exemplified by the following general equation (CH₃)₂C—R+C₆H₅OH → (CH₃)₂C—R
  |
  OH in which R is —CH₂COCH₃, —CH₂CH(OH)CH₃ or —C(OH)₂(CH₃)₂. When one mol. of each of the reactants is used the condensation can go one step farther forming a five-membered carbon side ring on the phenol. Thus with an alpha or beta dihydroxy compound an indane derivative is formed and with diacetone alcohol reacting in its enol form a derivative of indene is produced which upon pyrolysis also forms an indane derivative as is shown by the following equations:

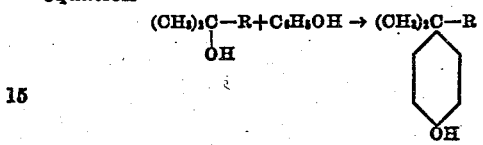

and

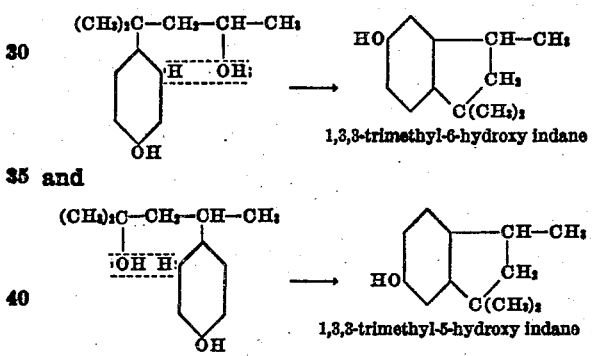

In producing the indanes from the reaction between 2-methyl-pentanediol-2,4 the process is carried out in a single operation so that the final product contains both these compounds. From pinacol and phenol

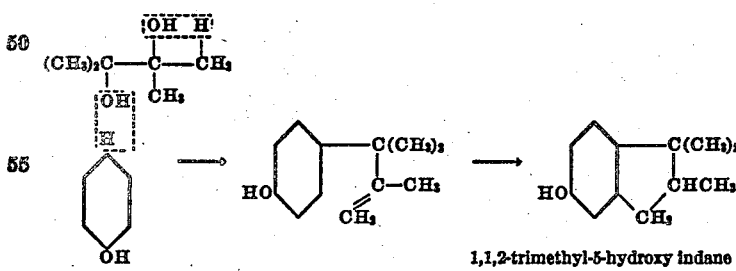

From diacetone alcohol and phenol

The 1,3,3-trimethyl-5-hydroxy indene, however, polymerizes readily under the conditions of the condensation and yields a resinous material. On distillation the polymeric material undergoes intermolecular hydrogenation and dehydration to form the corresponding indane and a resinous mass. The indane thus formed is identical with that obtained from one mol. each of phenol and 2-methyl-pentanediol-2,4.

In many of the condensations there is formed in addition to the type of product described above some p-tertiary butyl phenol and some p-isopropenyl phenol, the latter usually in the form of a polymeric resinous material. These are formed by a scission of the initial condensation product as follows:

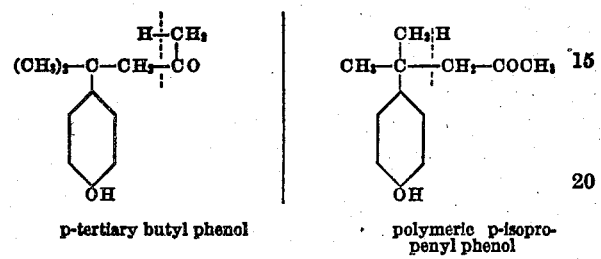

p-tertiary butyl phenol    polymeric p-isopropenyl phenol

All of these condensations are carried out in the presence of a condensing agent having an acidic reaction. These include acids such as sulfuric, hydrochloric, phosphoric etc. and metal salts such as the halides of aluminum, boron, copper, magnesium, tin, zinc etc. The relative amounts of reactants and condensing agent may vary over a very wide range depending principally on the number of mols of water to be removed during the condensation. Generally the amount of condensing agent will vary between one-half and two mols per mol. of phenol taking part in the reaction.

The following examples will serve to illustrate the invention. In these examples only one phenol, viz: phenol itself, and three of the oxygen-containing compounds, viz: diacetone alcohol, pinacol and 2-methyl-pentane-diol-2,4 are shown. It is understood, however, that any of the oxygen-containing bodies of the type described above and any phenol having available reactive hydrogen atoms, either ortho or para to the hydroxyl group, can be substituted for those specifically shown in the examples.

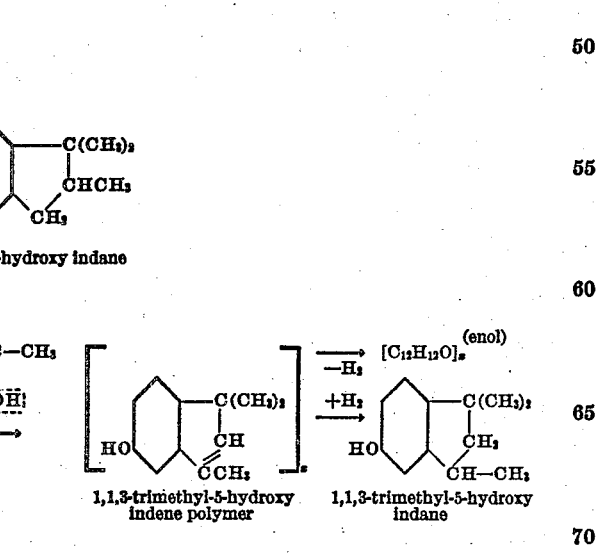

The temperature at which the reaction is carried out depends among other things on the condensing agent. When sulfuric acid is used, the reaction is usually carried out at relatively low temperature, for example 0°–40° C. in order to avoid sulfonation of the phenol or the product. When metal halides such as zinc chloride, magnesium chloride, copper chloride etc. are used, the temperature is preferably high, say 150°–250° C. When the sulfuric acid is diluted with a solvent such as acetic acid, the temperature may be raised to 70° C. or higher. With gaseous hydrogen chloride high temperatures, preferably about 40°–100° C., are employed. These temperatures can of course be varied depending on the reactants and the product desired.

Example 1

To a mixture consisting of equimolecular quantities of 2-methyl-pentane-diol-2,4 and phenol one mol. of powdered anhydrous zinc chloride is added and the mixture is quickly heated to the boiling point, about 190°–200° C. and is allowed to reflux for two hours. While the mixture is still warm, it is poured into water slightly acidified with hydrochloric acid whereupon an oil separates. This oil is repeatedly washed with water and purified. The purification may be carried out by direct distillation either at atmospheric or reduced pressure. It may also be purified by extracting first with alkalies or with Claisen's solution (50% potassium hydroxide solution and an equal volume of methyl alcohol) and after separation from this solution by acidification either with hydrochloric or sulfuric acids the resulting oil may then be subjected to a fractional distillation. The product resulting from this condensation is 1,3,3-trimethyl-6-hydroxy indane. It melts at 120° C., boils at 260°–265° C.; the dinitro derivative melts at 112° C., the dibromo derivative at 74° C. and the monobromo derivative of its methyl ether melts at 78° C. It is insoluble in water but soluble in alkalies and most organic solvents. It is best crystallized from the lower aliphatic hydrocarbons particularly petroleum ether of di-isobutylene.

There is always formed as a by-product some of the isomeric 1,3,3-trimethyl-5-hydroxy indane. These compounds have phenolic properties and therefore can undergo any of the usual reactions and processes of the phenols in which the acidic hydrogen or the aromatic nucleus is involved, such for instance as condensation with formaldehyde, acetone and other aldehydes and ketones. They may also be sulfonated and nitrated in the usual manner in order to produce various derivatives such as amino, diazo compounds etc.

On account of their phenolic nature (phenol coefficient about 23) they may be used as bactericides and germicides. They also exhibit oestrogenic properties. In exactly the same manner any alkyl phenol or the naphthols can be condensed with the 2-methyl-pentane-diol-2,4.

Example 2

To a mixture consisting of one mol. of pinacol and two mols of phenol, two mols of powdered anhydrous zinc chloride is added and the mixture is slowly heated to boiling, about 170°–180° C. The mixture is refluxed for about a day preferably in an atmosphere of dry hydrogen chloride. While still warm it is poured into water slightly acidified with hydrochloric acid and the oil which separates is purified as described in Example 1. The product obtained is 1,1,2-trimethyl-5-hydroxy indane melting at 120° C. and boiling at 260–265° C.

Any alkyl phenol or the naphthols may be condensed with pinacol in a similar manner.

Example 3

To a mixture of one mol. each of diacetone alcohol and phenol, one-half mol. of concentrated sulphuric acid diluted with three parts by weight of glacial acetic acid is added. This mixture is then allowed to stand at room temperature or heated on a steam bath to a temperature not exceeding 70° C. for several hours. While still warm the mixture is poured into water and the oil which separates is washed several times with water in order to remove the acids and any other water-soluble materials.

Example 4

Dry hydrogen chloride gas is passed slowly through a mixture of one mol. each of diacetone alcohol and phenol at room temperature or at a temperature of not exceeding 120° C. After several hours the reaction mixture is poured into water whereupon an oil separates. This is washed several times with water in order to remove the acid and any water-soluble materials. One of the products obtained by this procedure is 2-methyl-2-(p-hydroxy phenyl) pentanone-4.

Example 5

A mixture of equal mols of diacetone alcohol and phenol is diluted with an equal volume of p-cymene and this mixture is refluxed in an atmosphere of hydrogen with not more than one mol. of anhydrous zinc chloride for two hours. The reaction mixture is allowed to cool, is washed with water slightly acidified with hydrochloric acid. The p-cymene may be removed by distillation or the reaction products may be extracted with the Claisen mixture and subsequently recovered by acidification and further washing with water.

Example 6

A mixture of one mol. each of diacetone alcohol, phenol and powdered anhydrous zinc chloride is heated rapidly to 180° and refluxed for 90 minutes at this temperature. At the end of this time the mixture is poured into water slightly acidified with hydrochloric acid and the oil which separates is thoroughly washed with water to remove acid and any other water-soluble constituents.

Example 7

To a mixture of one mol. each of diacetone alcohol and phenol one mol. of finely powdered anhydrous magnesium chloride is added and the mixture is heated on an oil bath to 180° C. for several hours. After cooling it is poured into water slightly acidified with hydrochloric acid. The oil which separates is thoroughly washed with water in order to remove all water-soluble material.

The products obtained according to Examples 3 to 7 inclusive contain several compounds including the phenolic indenes, indanes and substituted phenols such as p-tertiary butyl phenol, p-isopropenyl phenol and phenylol ketones such as 2-methyl-2-(p-hydroxy phenyl) pentanone-4. These compounds may be separated by fractional distillation at reduced or atmospheric pressure. In many cases it is advantageous to dissolve the product in toluene or other similar hydrocarbon and then to extract it with Claisen's solution from which the products can be recovered by acidifying with hydrochloric or sulfuric acid.

The resulting oil is then dried and subjected to vacuum distillation.

On vacuum distillation several fractions may be collected as follows: At a pressure of 2–3 mm. of mercury up to 90° C. a blue colored liquid of unknown constitution and unreacted starting materials distill over. A second fraction from 91–130° C. at the same pressure consists of p-tertiary butyl phenol and 1,3,3-trimethyl-6-hydroxy indane. A third fraction boiling at about 180°–185° C. at 2–3 mm. pressure contains a resin which is a polymer of p-isopropenyl phenol. A fourth fraction at 210°–215° C. at the same pressure contains a resin resulting from the polymerization of 1,1,3-trimethyl-5-hydroxy indene. The distillation may also be carried out at atmospheric pressure under which conditions the following fractions may be obtained: Up to 220° C. unreacted starting materials and some p-tertiary butyl phenol; the second fraction from 220°–250° C. contains p-tertiary butyl phenol and the third fraction boiling from 250°–280° C. contains 1,3,3-trimethyl-6-hydroxy indane.

The indane products obtained from diacetone alcohol and the cresols have strongly aromatic, pleasant, thymol-like odors. The new phenolic indanes and indenes obtained according to the foregoing examples may be oxidized to yield first (4-hydroxy-2-acetyl phenyl) dimethyl acetic acid which may be further oxidized to form 4-hydroxy-2-acetyl benzoic acid. This product may also be further oxidized to yield a hydroxy phthalic acid or it may be distilled whereupon it loses carbon dioxide and forms m-hydroxy-aceto-phenone.

We claim:

1. The process of preparing 1,3,3-trimethyl-6-hydroxy indane which comprises reacting on 2-methyl-pentane-diol-2,4 with phenol in the presence of a condensing agent.

2. The process of preparing 1,1,3-trimethyl-5-hydroxy indene polymer which comprises reacting on diacetone alcohol with phenol in the presence of a condensing agent.

3. Phenols having an alkylated ortho-condensed, five-membered carbocyclic side ring.

4. Polymeric 1,1,3-trimethyl-5-hydroxy indene.

5. 1,3,3-trimethyl-6-hydroxy indane.

6. 1,3,3-trimethyl-5-hydroxy indane.

JOSEPH B. NIEDERL.
VICTOR NIEDERL.